United States Patent [19]

Ryang

[11] 4,404,350
[45] Sep. 13, 1983

[54] SILICONE-IMIDE COPOLYMERS AND METHOD FOR MAKING

[75] Inventor: Hong-Son Ryang, Schenectady, N.Y.

[73] Assignee: General Electric Company, Schenectady, N.Y.

[21] Appl. No.: 395,933

[22] Filed: Jul. 7, 1982

[51] Int. Cl.³ ............................................. C08G 77/04
[52] U.S. Cl. ..................................... 528/26; 525/431; 525/479
[58] Field of Search ................... 528/26; 525/431, 429

[56] References Cited

U.S. PATENT DOCUMENTS

| | | | |
|---|---|---|---|
| 3,288,754 | 11/1966 | Green | 528/26 |
| 3,325,450 | 6/1967 | Holub | 528/26 |
| 3,338,859 | 8/1967 | Green | 528/26 |

OTHER PUBLICATIONS

Nishizaki et al., Chem. Abstracts, vol. 63, 1965, 3057b.
Siloxanmodifizierte Polypyromellitimide, Kuckertz, Die Makromolekulare Chemie, 98 (1966) 101–108.
Polyimides form Silicon–Containing Dianhydrides and Diamines, Johnston et al., ACS Org. Cont. Plast. Chem., V. 33, 1973, pp. 169–176.
Organosilicon Compounds, XVIII, Silicon–Containing Dianhydrides, Pratt et al., J. Org. Chem., vol. 38, No. 25, 1973, pp. 4271–7274.
Effect of Elastomer Chain Length on Silicone–Modified Polyimide Properties, Ezzell et al., Abstract of 33rd Southern Regional ACS Mtg., p. 107 (1981).
Moshinskii et al., Chemical Abstracts, vol. 72 (1970).
Derwent, Week D38, p. 17, Soviet Union 761,521, 4/9/78.

Primary Examiner—Melvyn I. Marquis
Attorney, Agent, or Firm—William A. Teoli; James C. Davis, Jr.; James Magee, Jr.

[57] ABSTRACT

There is provided organopolysiloxane-polyimide copolymers based on the use of norbornane anhydride terminated organopolysiloxane, organic diamine and optionally other aromatic bisanhydride. The organopolysiloxane-polyimide copolymers can be used as insulation for electrical conductors, adhesives, molding compounds, coatings, laminates and tough elastomers.

11 Claims, No Drawings

SILICONE-IMIDE COPOLYMERS AND METHOD FOR MAKING

CROSS REFERENCE TO RELATED APPLICATIONS

References is made to my copending application Ser. No. 395,932, filed June 30, 1982, for Silylnorbornane Anhydrides and Method for Making filed concurrently herewith and assigned to the same assignee as the present invention.

BACKGROUND OF THE INVENTION

The present invention relates to organopolysiloxane-polyimide copolymers based on the use of norbornane anhydride terminated organo polysiloxane and organic diamine.

Prior to the present invention, as shown by Holub, U.S. Pat. No. 3,325,450, and Heath et al, U.S. Pat. No. 3,847,867, silicon-polyimide copolymers were prepared by the reaction of aromatic bis(anhydride)s and amine organo-terminated polydiorganosiloxanes. For example, Holub shows the use of aminopropyl polydimethylsiloxane and amine butyltetramethyldisiloxane, as well as the employment of other diamines, for example, metaphenylenediamine. The production of such silicone-polyimide block polymers provide valuable compositions useful for example, as high temperature resistant electrical insulation.

As shown by copending application Ser. No. 395,932, norbornane-terminated polydiorganosiloxane of the formula,

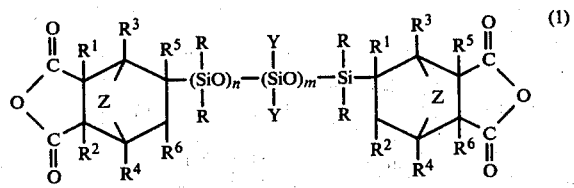

where R is selected from $C_{(1-13)}$ monovalent hydrocarbon radicals and substituted $C_{(1-13)}$ monovalent hydrocarbon radicals, $R-R^6$ are selected from hydrogen, halogen and the same or different $C_{(1-13)}$ monovalent hydrocarbon radicals and substituted $C_{(1-3)}$ monovalent hydrocarbon radicals, Z is a divalent radical selected from —O— and —C($R^1$)$_2$—, Y is a radical selected from R and

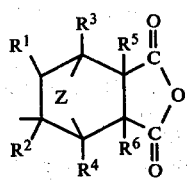

n is an integer equal to 0 to 2000 inclusive, m is a whole number equal to 0 to 500, and the sum of n+m is equal to 0 to 2000 inclusive, can be made by the hydrosilation of norbornene anhydride and derivatives thereof and a silicon hydride in the presence of a platinum catalyst as shown by the following equation:

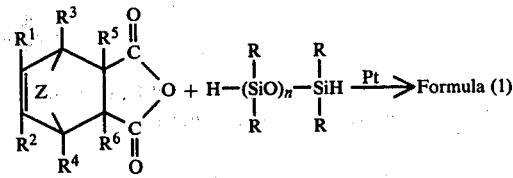

where $R^1$-$R^6$, Z and n are as defined above.

Radicals included within R are, for example aryl radicals and halogenated aryl radicals, for example, phenyl, chlorophenyl, tolyl, xylyl, biphenyl, naphthyl, etc.; alkenyl radicals, for example, vinyl, allyl, cyclohexenyl, etc.; $C_{(1-8)}$ alkyl radicals and halogenated alkyl, for example, methyl, ethyl, propyl, butyl, octyl, etc.

Radicals included within $R^1$-$R^6$ are, for example hydrogen, chloro, and R radicals as defined above.

Another procedure shown in copending application RD-14198 is by equilibrating a dianhydride within the scope of formula (1) where n is less than 2000 with a cyclic organopolysiloxane, for example octamethylcyclotetrasiloxane in the presence of an acid catalyst, for example sulfuric acid.

The present invention is based upon the discovery that silicone-polyimide copolymers having superior thermal oxidative stability and unusually high heat distortion temperatures can be made by effecting reaction between norbornane anhydride-terminated polydiorganosiloxane of formula (1) and organic diamine of the formula, $$NH_2R^7NH_2 \quad (2)$$

and optionally with organic dianhydride of the formula,

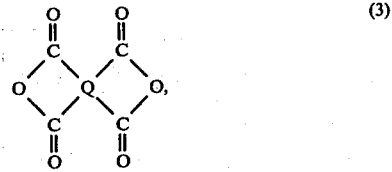

where Q is a tetravelent organo radical selected from the class consisting of

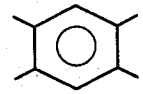

and

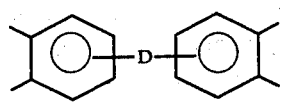

where D is a member selected from

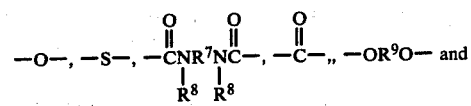

-continued

where $R^8$ is selected from hydrogen and R, $R^9$ is a member selected from the class consisting of

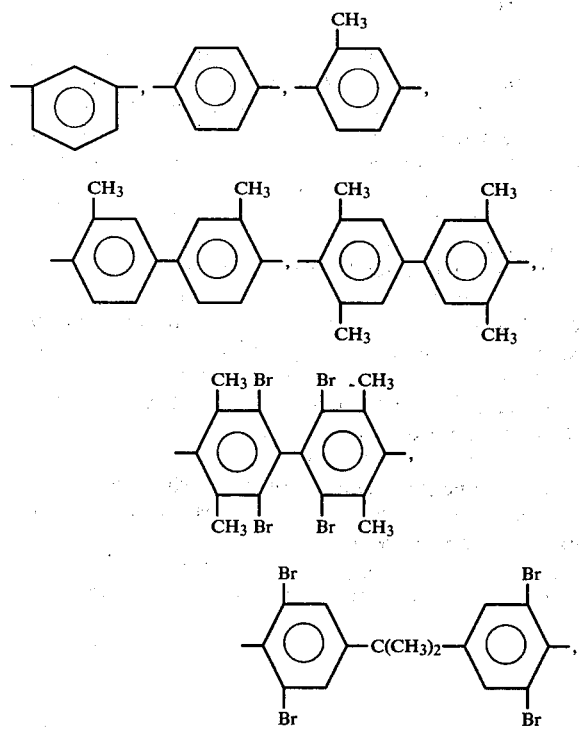

and divalent organic radicals of the general formula,

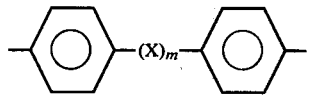

where X is a member selected from the class consisting of divalent radicals of the formulas,

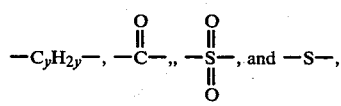

where m is 0 or 1, y is a whole number from 1 to 5, $R^7$ is a divalent $C_{(2-20)}$ organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) divalent radicals included by the formula,

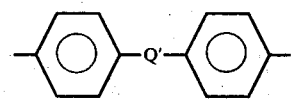

Q' is a member selected from the class consisting of

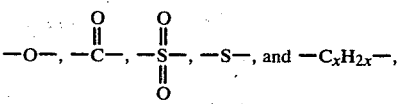

x is a whole number from 1 to 5 inclusive.

STATEMENT OF THE INVENTION

There is provided by the present invention, silicone-polyimide copolymers comprising norbornane terminated polydiorganosiloxane of the formula

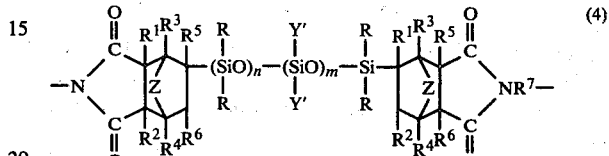

where $R-R^7$, Z, m and n are as previously defined and Y' is selected from R and a group having the formula,

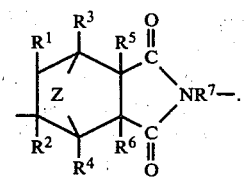

Some of the silicon-imide copolymers which are included within the present invention comprise norbornane terminated polydiorganosiloxane of the formula,

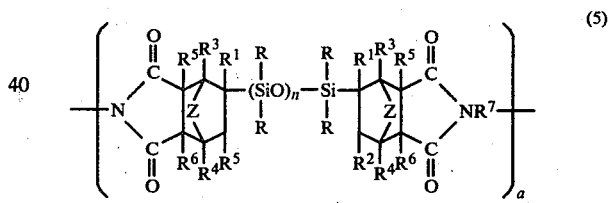

chemically combined with polyimide of the formula,

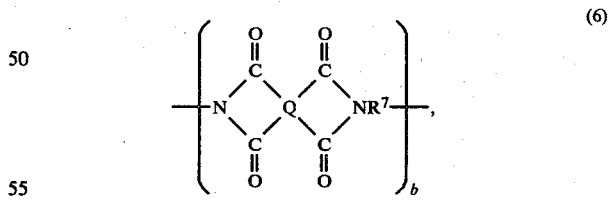

where $R-R^7$, n, Q, and Z are as previously defined, and a is an integer equal to 1 to 1000 inclusive, b is a whole number equal to 0 to 200 inclusive and the sum of a+b is equal to 1 to 1000 inclusive.

Organic dianhydrides of formula (3) which can be utilized in the practice of the present invention in combination with the norbornene anhydride-terminated siloxanes of formula (1) are, for example, pyromellitic dianhydride, benzophenone dianhydride, aromatic bis(ether anhydride)s of Heath et al, U.S. Pat. No. 3,879,428, assigned to the same assignee as the present invention, dianhydride of the formula,

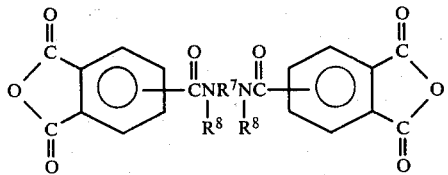

and mixtures thereof, where $R^7$ and $R^8$ are as previously defined.

Included within the organic diamines of formula (2) are compounds such as
m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-diaminotoluene;
2,6-diaminotoluene;
2,4-bis(p-amino-t-butyl)toluene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,15-octadecanediamine;
bis(3-aminopropyl)sulfide;
N-methyl-bis(3-aminopropyl)amine;
hexamethylenediamine;
heptamethylenediamine;
2,4-diaminotoluene;
nonamethylenediamine;
2,6-diaminotoluene;
bis-(3-aminopropyl)tetramethyldisiloxane, etc.

The silicone-polyimide copolymers can be synthesized by a two-step procedure involving the reaction at ambient temperatures in the presence of an inert organic solvent of substantially equal molar amounts of the organic diamine of formula (2) and norbornane terminated polydiorganosiloxane of formula (1), or optionally with organic dianhydride with formula (3), where the total moles of organic diamine and dianhydride are substantially the same. The intermediate polyamic acid initially formed at room temperature is followed by cyclodehydration at elevated temperatures, for example, from 150° C. to 220° C.

Another procedure which can be used to make the silicone-imide copolymers is by refluxing substantially equal molar amounts of the organic diamine of formula (2) and the norbornane dianhydride and optionally other organic dianhydride in an inert organic solvent, for example, o-dichlorobenzene, meta-cresol, etc.

Dipolar aprotic solvent, for example dimethylformamide, dimethylacetamide, N-methylpyrrolidone, can be used to prepare prepolymers. The proportions of norbornane anhydride-terminated polydiorganosiloxane with at least one other organic dianhydride in various molar proportions can be reacted with a substantial equal molar amount or organic diamine to produce a wide variety of silicone-polyimide block polymers.

The silicon-polyimide copolymers of the present invention can be used as insulation for electrical conductors, adhesives, molding compounds, coatings, for making laminates and tough elastomers.

In order that those skilled in the art will be better able to practice the invention, the following example is given by way of illustration and not by way of limitation. All parts are by weight.

EXAMPLE

There was added 10 drops of a 5% platinum catalyst prepared in accordance with Karstedt, U.S. Pat. No. 3,775,442, assigned to the same assignee as the present invention, to a mixture while it was being stirred of 69.4 g (0.42 mole) of 5-norbornene-2,3-dicarboxylic acid anhydride, 26.8 g (0.2 mole) 1,1,3,3-tetramethyldisiloxane and 100 ml of dry chlorobenzene. The resulting mixture was heated with stirring to 70°–80° C. for 4 hours and then 100°–110° C. overnight. After cooling, carbon black was added and the solution was stirred for 30 minutes at room temperature. Filtration, removal of the solvent at 100° C. with a vacuum pump and addition of dry diethylether resulted in the precipitation of a white crystalline solid. Based on method of preparation, the product was 5,5'-(1,1,3,3-tetramethyl-1,1,3-disiloxanediyl)-bis-norbornane-2,3-dicarboxylic anhydride having the formula,

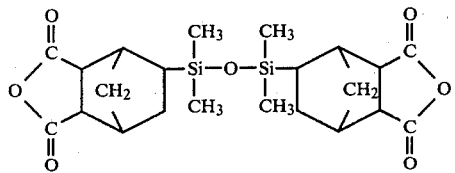

A series of silicon-imide copolymers including block copolymers were prepared from various mixtures of the above 5,5'-(1,1,2,3-tetramethyl-1,3-disiloxanedyl)-bis-norbornane-2,3-dicarboxylic dianhydride, hereinafter referred to as (NSDA), and benzophenone tetracarboxylic dianhydride (BPDA).

There was added to a solution of 0.991 grams ($5 \times 10^{-3}$ moles) of methylene dianiline and 5 ml of dimethylformamide while it was stirred under nitrogen, a mixture of 0.457 grams ($10^{-3}$ mole) of NSDA, 1.289 grams ($4 \times 10^{-3}$ mole) of BPDA and 5 ml of dimethylformamide. The resulting solution was stirred for 2 hours at room temperature. There was obtained a silicone-amide acid copolymer. The solution was then poured into a glass dish and dried at 80° C. for 1 hour, and 150° C. for 2 hours in an oven cast under flowing nitrogen. Based on method of preparation, IR and NMR analysis, there was obtained a silicone-poly copolymer consisting essentially of norbornane terminated dimethylsiloxane groups of the formula,

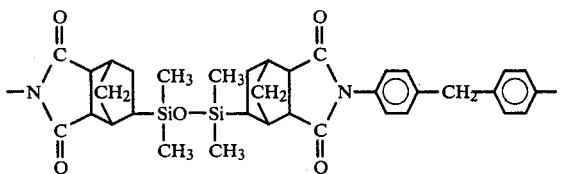

chemically combined with imide groups having the formula,

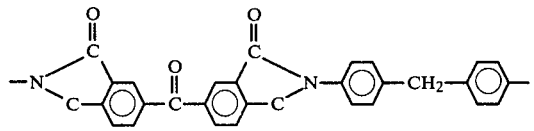

The same procedure was repeated to prepare an additional silicone-imide block polymers within the scope of formula (1) as shown by the following formula:

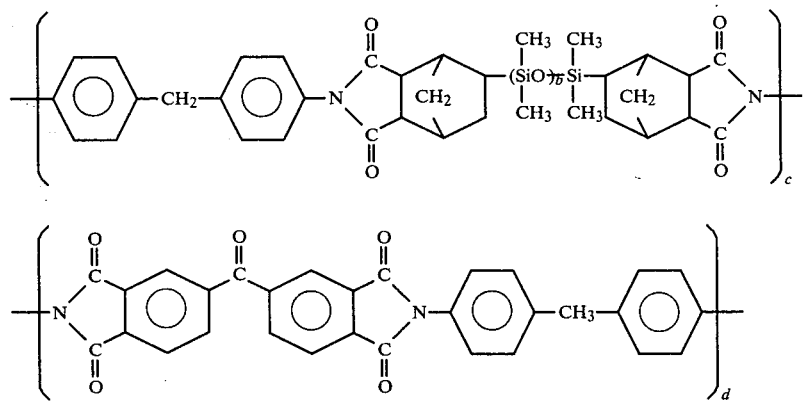

Glass transition temperatures (Tg) of the copolymers were measured by differential scanning calorimetry (DSC) and are shown in the following table, where b, c and d values in the above formula are shown. Thermal oxidative stabilities of the copolymers were measured by thermogravimetric analysis (TGA). Ten percent weight loss temperatures of the copolymers under $N_2$ and air are also shown:

| b | c | d | Tg (°C.) (DSC) | TGA (°C.) $N_2$ 10% loss | TGA (°C.) Air 10% loss |
|---|---|---|---|---|---|
| 0 | 0 | 10 | 270 | 550 | 530 |
| 1 | 2 | 8 | 243 | 515 | 520 |
| 1 | 5 | 5 | 233 | 495 | 490 |
| 1 | 8 | 2 | 183 | 490 | 475 |
| 1 | 10 | 0 | 163 | 505 | 505 |
| 13 | 1 | 9 | 256 | 530 | 545 |
| 25 | 1 | 9 | 271 | 510 | 490 |
| 66 | 1 | 9 | 278 | 530 | 515 |

The above results show that the silicone-imide copolymers of the present invention can be used as high temperature insulation for metallic conductors which possesses superior oxidative stability. For example, a copper wire is dipped into a dimethylformamide solution of the silicone-amic acid copolymer and removed from the solution and allowed to air dry. The coated wire is then heated to 200° C. to convert the amide acid coating on the wire to the imide state. The resulting silicone-imide copolymer coating is superior high temperature insulation possessing superior oxidative stability.

Although the above example is directed to only a few of the very many variables of the silicone-imide copolymers of the present invention, it should be understood that the present invention is directed to a much broader variety of such silicone-imide copolymers including block copolymers, based on the employment of norbornane anhydride-terminated polydiorganosiloxane of formula (1) with organic diamine of formula (2) and optionally with mixtures of norbornane anhydride-terminated polydiorganosiloxane of formula (1) and other organic dianhydrides of formula (3) as previously taught in the description preceding these examples.

What I claim as new and desire to secure by Letters Patent of the United States is:

1. Silicone-imide copolymers comprising norbornane terminated polydiorganosiloxane groups of the formula

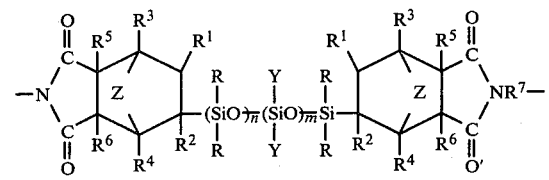

where R is selected from the group consisting of $C_{(1-13)}$ monovalent hydrocarbon radicals and substituted $C_{(1-13)}$ monovalent hydrocarbon radicals, $R^1$-$R^6$ are selected from the group consisting of hydrogen, halogen and the same or different $C_{(1-13)}$ monovalent hydrocarbon radicals and substituted $C_{(1-13)}$ monovalent hydrocarbon radicals, $R^7$ is a divalent $C_{(2-20)}$ organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, $C_{(2-8)}$ alkylene terminated polydiorganosiloxane, and (c) divalent radicals included by the formula,

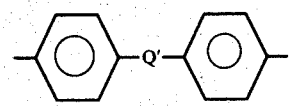

Q' is a member selected from the class consisting of

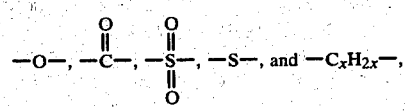

x is a whole number from 1 to 5 inclusive, Z is a divalent radical selected from —O— and —C(R$^1$)$_2$—, Y is a radical selected from R and

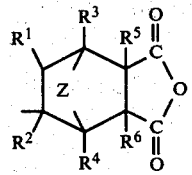

n is an integer equal to 0 to 2000 inclusive, m is a whole number equal to 0 to 500, and the sum of n+m is equal to 0 to 2000 inclusive.

2. Silicone-imide copolymer in accordance with claim 1, having chemically combined imide of the formula,

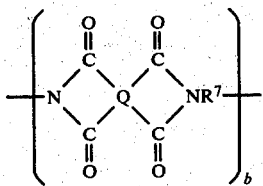

where Q is a tetravalent organo radical selected from the class consisting of

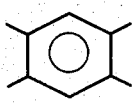

and

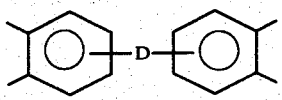

where D is a member selected from

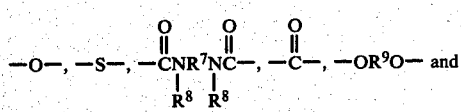

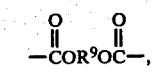

where R$^8$ is selected from hydrogen and R and R$^9$ is a member selected from the class consisting of

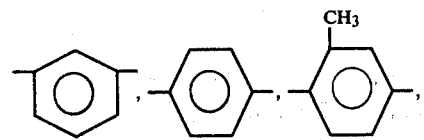

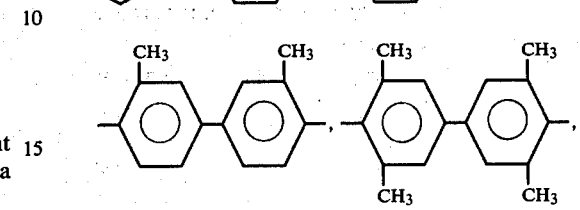

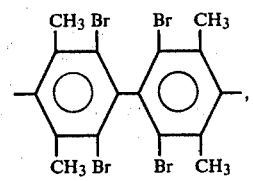

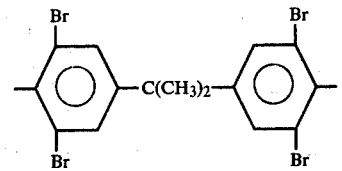

and divalent organic radicals of the general formula,

where X is a member selected from the class consisting of divalent radicals of the formulas,

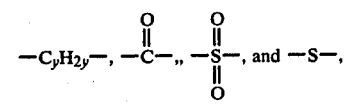

where m is 0 or 1, y is a whole number from 1 to 5, R$^7$ is a divalent C$_{(2-20)}$ organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, C$_{(2-8)}$ alkylene terminated polydiorganosiloxane, and (c) divalent radicals included by the formula

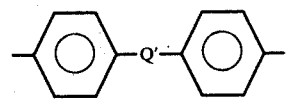

Q' is a member selected from the class consisting of

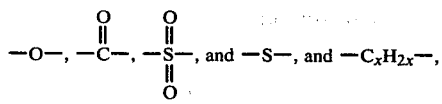

x is a whole number from 1 to 5 inclusive and b is a whole number equal to 0 to 200 inclusive.

3. A silicone imide copolymer in accordance with claim 1, where R is methyl.

4. A silicone imide copolymer in accordance with claim 2, where Q is

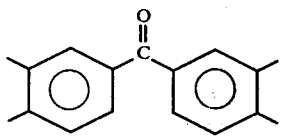

5. A silicone-imide copolymer in accordance with claim 2 where Q is

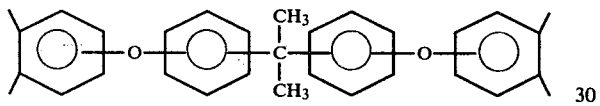

6. A silicone imide copolymer in accordance with claim 1, where $R^7$ is

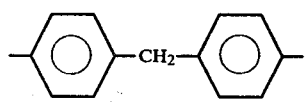

7. A silicone-imide copolymer in accordance with claim 1, where $R^7$ is

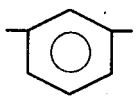

8. A silicone-imide copolymer in accordance with claim 1, where $R^1$-$R^6$ is hydrogen and Z is —$CH_2$—.

9. A silicone-imide copolymer, consisting essentially of chemically combined silicone units of the formula,

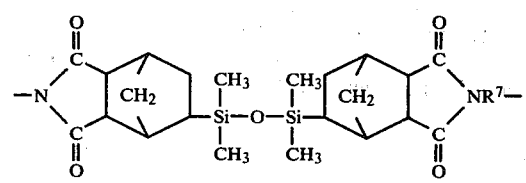

where $R^7$ is a divalent $C_{(2-20)}$ organo radical.

10. A silicone-imide copolymer in accordance with claim 8, where $R^7$ is

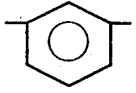

11. A silicone-imide copolymer in accordance with claim 8, where $R^7$ is

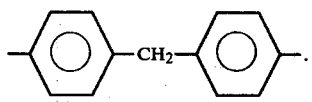

* * * * *